United States Patent [19]

Gügel et al.

[11] Patent Number: 4,698,474
[45] Date of Patent: Oct. 6, 1987

[54] WELDING TONGS FOR CONNECTING TWO ABUTTING PIPE ENDS BY ARC WELDING

[75] Inventors: Siegfried Gügel, Erlangen; Dieter Pellkofer, Herzogenaurach; Siegfried Förner, Erlangen, all of Fed. Rep. of Germany

[73] Assignee: Kraftwerk Union Aktiengesellschaft, Mülheim/Ruhr, Fed. Rep. of Germany

[21] Appl. No.: 727,517

[22] Filed: Apr. 26, 1985

[30] Foreign Application Priority Data

Apr. 27, 1984 [DE] Fed. Rep. of Germany ....... 3415755

[51] Int. Cl.⁴ ......................... B23K 9/02; B23K 37/02
[52] U.S. Cl. ................................ 219/60 A; 219/60 R
[58] Field of Search ...................... 219/60 A, 60 R, 61, 219/125.1, 125.11

[56] References Cited

U.S. PATENT DOCUMENTS

| | | | |
|---|---|---|---|
| 3,560,696 | 2/1971 | Grinenko et al. | 219/60 A |
| 3,649,799 | 3/1972 | Jeromson, Jr. | 219/60 A |
| 3,688,071 | 8/1972 | Kennelly | 219/60 A |
| 4,068,791 | 1/1978 | Scholtus et al. | 219/60 A X |
| 4,161,640 | 7/1979 | Bromwich et al. | 219/60 A |
| 4,554,429 | 11/1986 | Kazlauskas | 219/60.2 |

Primary Examiner—E. A. Goldberg
Assistant Examiner—Catherine M. Sigda
Attorney, Agent, or Firm—Herbert L. Lerner; Laurence A. Greenberg

[57] ABSTRACT

Welding tongs for connecting two abutting pipe ends to each other by arc welding, includes two rigid jaws, a clamping device in the form of two symmetrical clamping jaws guided in the rigid jaws in radial direction of the surface of a pipe, the clamping jaws having contact surfaces adapted to the surface of a pipe for holding at least one pipe end, two angle levers each being connected to a respective one of the clamping jaws, a tie rod connected to the angle levers, a pair of levers connected to the tie rod and operating in vicinity of an extended position thereof, an operating handle connected to the pair of levers, a spring member biased between the clamping jaws and the pair of levers, a track, a welding electrode disposed on the track, and a motor connected to the electrode for moving the electrode along the track.

10 Claims, 7 Drawing Figures

WELDING TONGS FOR CONNECTING TWO ABUTTING PIPE ENDS BY ARC WELDING

The invention relates to welding tongs for connecting two abutting pipe ends by arc welding, including a clamping device for fixing at least one pipe end in place and an electrode movable by a motor on a track defined by the tongs, the clamping device including two symmetrical clamping jaws with a contact surface adapted to the surface of the pipe, the clamping jaws being disposed in two rigid jaws of the tongs, being movable radially toward the pipe surface and being connected to a tie rod through two angular levers.

Such welding tongs, which are described in U.S. Pat. No. 4,161,640, automatically produce a joint between the abutting pipe ends, i.e. without further manual action. Since the possibility of making corrections is eliminated in such a device, accurate alignment of the electrode mounted on the welding tongs to the abutment between the two pipe ends, is important. Even deviations of less than 1 mm lead to the possibility of developing impermissible defects at the joint. This applies particularly to the use of such welding tongs in the piping of a nuclear power station which, as is well known, must meet particularly stringent quality requirements.

It is accordingly an object of the invention to provide welding tongs for connecting two abutting pipe ends by arc welding, which overcome the hereinafore-mentioned disadvantages of the heretoforeknown devices of this general type.

With the foregoing and other objects in view there are provided, in accordance with the invention, welding tongs for connecting two abutting pipe ends to each other by arc welding, comprising two rigid jaws, a clamping device in the form of two symmetrical clamping jaws guided in the rigid jaws in radial direction of the surface of a pipe, the clamping jaws having contact surfaces adapted to the surface of a pipe for holding at least one pipe end, two angle levers each being connected to a respective one of the clamping jaws, a tie rod connected to the angle levers, a pair of levers connected to the tie rod and operating in vicinity of an extended position thereof, an operating handle connected to the pair of levers, a spring member biased or built-in between the clamping jaws and the pair of levers, a track connected to the tongs or the rigid jaws, a welding electrode disposed on the track, and a motor connected to the electrode for moving the electrode along the track.

Through the use of the new clamping device, a self-centering adaptation to different pipe surfaces is obtained, independent of the holding force. The tie rod is actuated so far during the tightening that the pair of levers is brought beyond the extended position. Therefore, a self-locking action is at the same time brought about by the spring, which results in a certain amount of play. This matching to different types of surfaces and diameters also distinguishes the invention from welding tongs which are known from U.S. Pat. No. 3,688,071. Such tongs have a toggle joint for operating tong members, which can only provide a secure support for a single pipe diameter with their circular contact surfaces.

In accordance with another feature of the invention, the spring member surrounds the tie rod, the tie rod has a threaded section, and including a nut disposed on the threaded section for adjusting the effective length of the tie rod and matching different pipes, another lever being braced against the nut by the spring member, the other lever having one end connected or linked to the handle or the tongs, and another end connected to the pair of levers. This spring serves as the resilient member which supplies the holding force of the clamping jaws and permits a certain amount of play between the clamping jaws.

In accordance with a further feature of the invention, the clamping jaws open in a given opening direction, and including another spring biasing the tie rod for moving the clamping jaws in the opening direction. This is done for greater ease of handling. After passing dead center, a complete opening of the clamping jaws can be obtained with this spring. The tongs can then be removed from the pipe without further actuation.

In accordance with an added feature of the invention, the clamping jaws fix the axis of the pipe in place, the track is a slide being adjustable in position relative to the clamping jaws, and including means cooperating with the slide for moving the electrode along a straight line at right angles to the axis of the pipe and parallel to the axis of the pipe. The slide movement provides exact matching.

In accordance with an additional feature of the invention, the electrode moving means include adjusting screws and a braking nut securing the adjusting screws up to a predetermined break away torque. The breaking nut prevents unintentional movement.

In accordance with again another feature of the invention, the motor for the electrode is disposed along the track of the tongs parallel to the tie rod, and the tie rod and motor are disposed or integrated in the handle. This is done because the motor for moving the electrode cannot be smaller than a certain size in view of the accuracy requirement for guidance and for the mechanical parts. Integrating the parts in a handle of the tongs ensures a compact construction.

In accordance with again a further feature of the invention, there is provided a miter gear transmission connecting the motor to the electrode, the transmission including miter gears, another spring, and means for manually adjusting or disengaging the miter gears against the force of the other spring.

In accordance with again an added feature of the invention, the transmission includes an operating lever on the handle for disengaging the transmission. This permits an adjustment of the electrode by hand without the motion of the motor.

The welding tongs according to the invention can also be used if the weld is made with a welding additive. For this purpose, the electrode is advantageously associated with a motor-operated wire advancing mechanism with a cold-wire nozzle for a welding additive in wire form, directed toward the tip of the electrode.

In accordance with a concomitant feature of the invention, there is provided a wire advancing mechanism having a two-roller drive for directional adjustment. It is therefore possible to process a welding additive in wire form directly with the welding tongs. Thus, the connections to a wire advancing mechanism which are otherwise used and which make the handling of such welding tongs more difficult, are omitted. With the invention, short pieces of wire which are held directly by the wire-advancing mechanism, can be processed.

Other features which are considered as characteristic for the invention are set forth in the appended claims.

Although the invention is illustrated and described herein as embodied in welding tongs for connecting two abutting pipe ends by arc welding, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
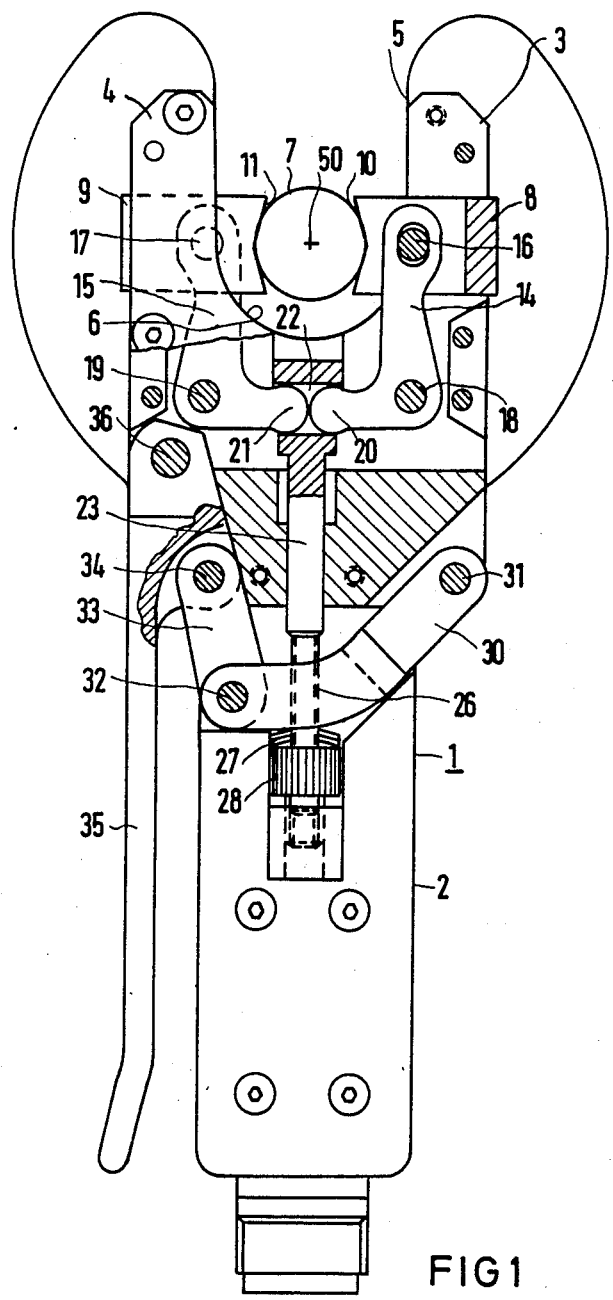
FIG. 1 is a partly cross-sectional and partly broken-away front-elevational view of the welding tongs according to the invention.

Referring now to the figures of the drawings in detail and first particularly to FIG. 1 thereof, there are seen welding tongs 1 for connecting two abutting pipes, having a handle 2 which is approximately 10 cm long, from which two symmetrical rigid jaws 3 and 4 protrude, defining an opening 5 for receiving the pipe ends to be welded. In vicinity of the handle 2, the opening 5 is rounded off by a circular arc 6. A pipe end 7 shown in FIG. 1, has a diameter of about 20 mm and is located at the center 50 of the arc 6.

In the rigid jaws 3 and 4, two oppositely disposed movable clamping jaws 8 and 9 are movably guided along a straight line passing through the center 50, in a radial direction relative to the rounded portion 6. The clamping jaws 8 and 9 have wedge-shaped contact surfaces 10 and 11 which are facing the pipe 7. The jaws 8, 9 are actuated by two angle levers 14 and 15 which are connected to the clamping jaws 8, 9 by pins 16, 17.

The angle levers 14, 15 are supported at the jaws 3 and 4 by pins 18, 19. Ends 20 and 21 of the angle levers 14, 15 which face away from the clamping jaws 8, 9, are spherically rounded and engage a slot 22 formed in a tie rod 23. The tie rod is supported in the handle 2, at the transition from the handle to the jaws 3, 4, so as to be movable longitudinally or lengthwise.

The end of the tie rod 23 facing away from the angle levers 14, 15 is provided with a thread 26. Cup springs 27 which are braced against a knurled nut 28, are mounted at the end of the tie rod.

A first fork-shaped lever 30 is disposed on the side of the cup springs 27 facing away from the knurled nut. The fork-shaped lever 30 extends around the threaded part 26 of the tie rod 23, which is linked by a pin 31 to the base body formed by the jaws 3, 4 and the handle 2. The other end of the lever 30 is connected by a pin or fastener 32 to a strap 33 which is in turn linked by a pin or fastener 34 to a handle 35 which may also be referred to as a second lever with a handle protruding therefrom.

The handle 35 is likewise fastened to the base body by a pin or fastener 36. The handle 35 and the strap 33 form a toggle joint for actuating the tie rod 23 through the lever 30. The toggle or knee joint can be brought against the handle 2 beyond the extended or stretched position for self-locking.

Figure 2:
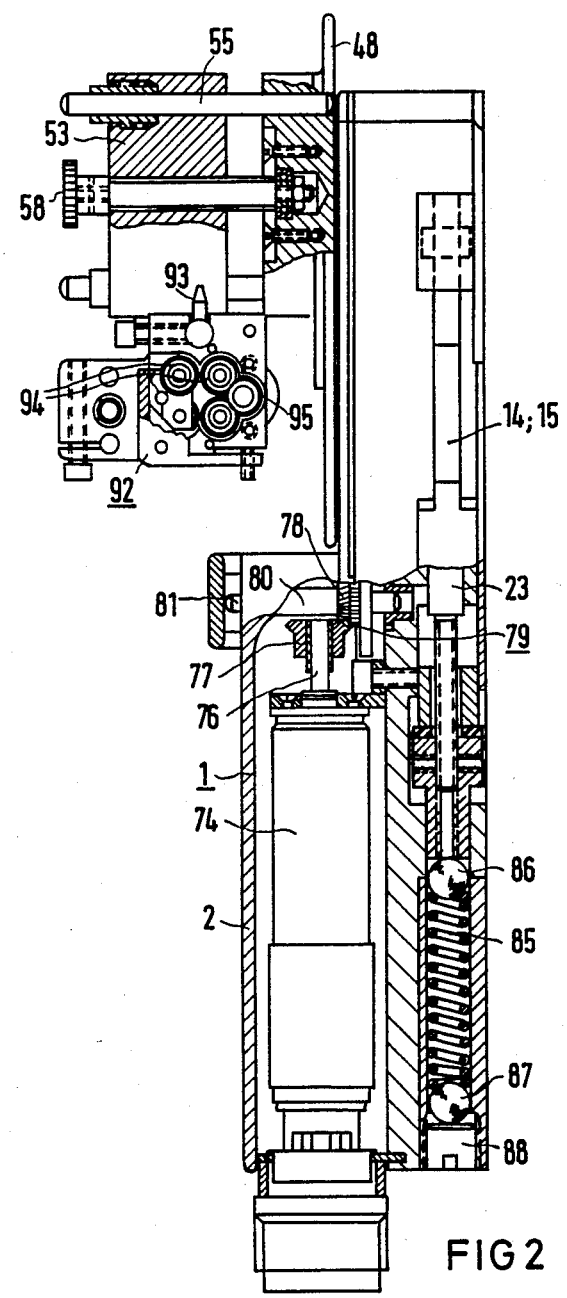
FIG. 2 is a partly cross-sectional and partly broken-away side-elevational view showing the wire advancing and welding head adjusting mechanisms.
Figure 5:
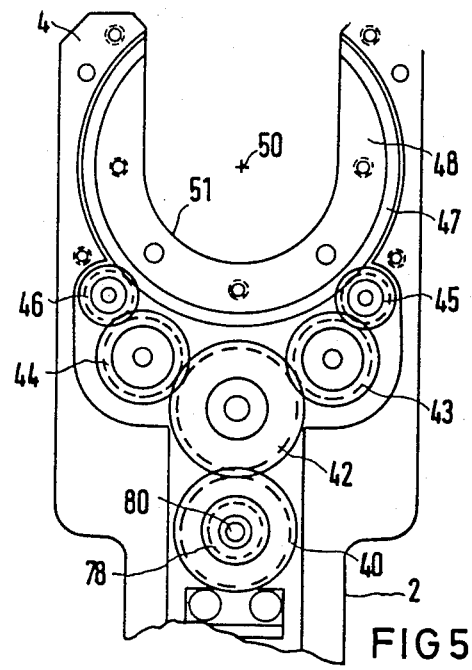
FIG. 5 is a fragmentary front-elevational view of the gearing for operating the disc.
Figure 7:
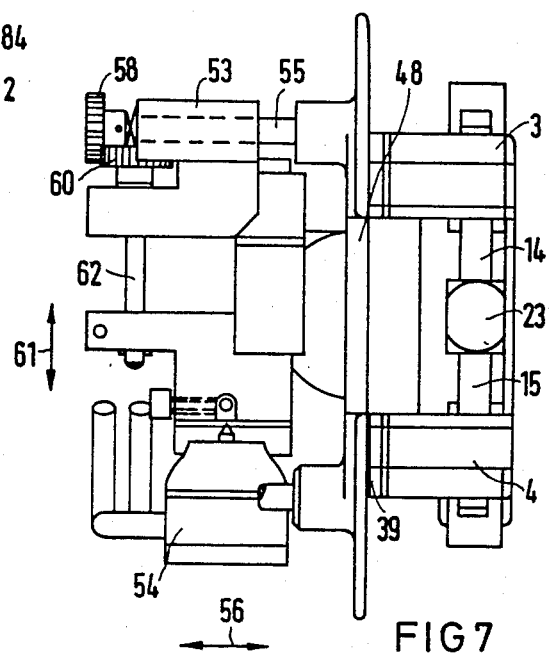
FIG. 7 is a side-elevational view of the welding head adjusting mechanism.

A gear combination is disposed in the handle 2 and the rigid jaws 3 and 4, which is covered by a plate 39 shown in FIG. 7. The gear combination is shown in FIG. 5 and includes a drive gear 40 which meshes with a distributor gear 42. The distributor gear operates two identical intermediate gears 43 and 44, which in turn operate two drive gears 45 and 46 which mesh with a spur gear 47 of a disc 48. The disc 48 is rotatably disposed in a slot between the plate 39 and the jaws 3, 4, as shown in FIGS. 2 and 7. The disc 48 has a cutout 51 formed therein coinciding with the opening 5, so that the opening 5 between the jaws 3 and 4 is fully exposed in the position shown in FIG. 5. However, upon operation of the drive gear 40, the disc 48 is shifted about the center 50 of the rounded portion 6, to which the pipe to be welded is centered by means of the clamping jaws 8, 9.

As shown in FIGS. 2 and 7, the disc 48 carries a slide 53 for a welding head 54 on the side thereof facing away from the jaws 3 and 4. The welding head is adjustable transversely to the jaws 3 and 4 on a pair of pins 55, as is indicated by an arrow 56 in FIG. 7. The adjustment can be finely set by a knurled screw 58. A further knurled screw 60 permits an adjustment of the welding head 54 at right angles to the pins 55, in the direction of an arrow 61. The welding head is guided on pins 62. The welding head 54 can be adjusted along the pins 62 parallel to the adjustment motion of the clamping jaws 8, 9, relative to the pipe ends 7 to be welded.

Figure 4:
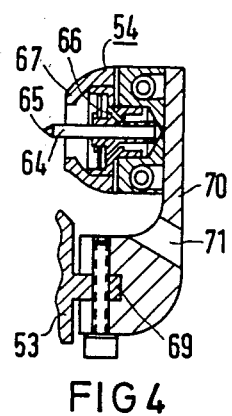
FIG. 4 is a fragmentary cross-sectional view of the welding head.

FIG. 4 shows a cross section through the welding head 54. FIG. 4 also shows a tungsten electrode 64 with an electrode tip 65 and canals 66 for a protective gas which surrounds the electrode tip and is directed toward the electrode tip 65 by means of a nozzle body 67. The welding head 54 is mounted on a holder 70 connected to the slide 53 by a joint 69. The holder 70 is provided with an observation hole 71 for the arc.

Figure 6:
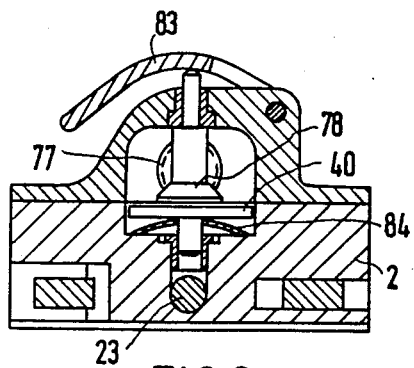
FIG. 6 is a cross-sectional view of the clutch for disengaging the motor.

FIG. 2 is a cross section through the welding tongs 1, in the longitudinal direction of the handle 2, showing an electric motor 74 which is accomodated in the handle 2. Mounted on the shaft 76 of the electric motor is a spur gear 77, which forms a miter gear transmission 79 together with a meshing gear 78. The meshing gear 78 is mounted on a common shaft 80, which also supports the drive gear 40, as shown in FIG. 5. A clutch is provided between the spur gear 77 and the meshing gear 78, which makes it possible to disengage the drive motor 74. The shaft 80 of the meshing gear 78 leads out of the handle 2 with a pin 81. As is shown in FIG. 6, the pin can be adjusted by a lever 83 against the action of a leaf spring 84, on the side of the meshing gear 78 located behind the drive gear 40. This is done in such a way that the meshing gear 78 comes out of engagement with the spur gear 77. It is then possible to manually bring the disc 48 out of engagement with the motor 74.

It can also be seen from FIG. 2 that a coil spring 85 is provided with two balls 86 and 87 at the ends thereof. The spring pushes on the end of the tie rod 23 facing away from the angle levers 14, 15. The ball 87 is braced against a nut 88, which is screwed into the handle 2. The spring 85 exerts a pretension on the angle levers 14, 15 in the opening direction of the clamping jaws 8, 9.

Figure 3:
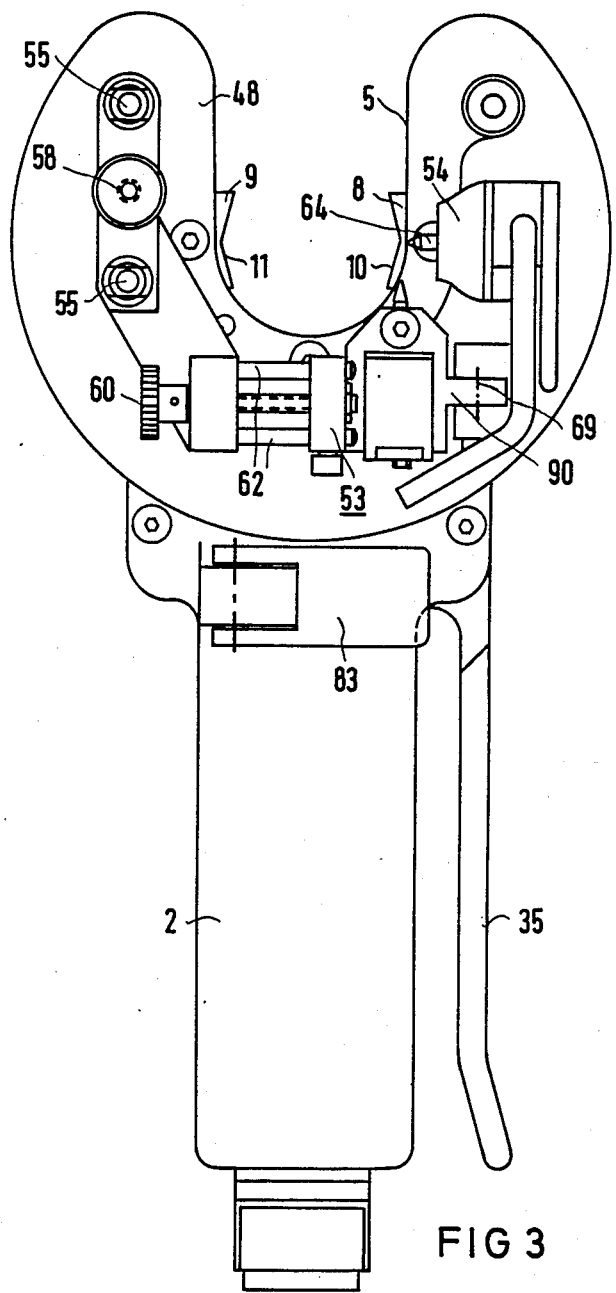
FIG. 3 is a rear-elevation view of the device shown in FIG. 1.

In FIG. 3, the adjustment of the welding head 54 can be viewed from another direction. FIG. 3 shows the holding pins 55 which engage the disc 48 and the knurled nut 58 for adjusting the welding head 54 transversely to the plane of the disc 48. FIG. 3 also shows that the welding head 54 is connected by a joint connection 69 to a part 90 of the slide 53, which is acted upon in the longitudinal or lengthwise direction of the electrode 64 by the adjusting mechanism operated by the knurled nut 60. FIG. 3 furthermore shows clearly that the clamping jaws 8, 9 project into the slot 5 with contact surfaces 10, 11.

A wire-advancing mechanism 92 associated with the welding head 54 can be seen in FIG. 2. The advancing mechanism includes a cold wire nozzle 93, through which pieces of wire of a desired length, for instance, 5 to 50 cm, are pushed forward by means of a pair of rolls 94 which is directly operated by an electric motor 95. Therefore, no connection remains in the way to interfere with other stationary welding wire supplies.

We claim:

1. Welding tongs for connecting two abutting pipe ends to each other by arc welding, comprising two rigid jaws, a clamping device in the form of two symmetrical clamping jaws guided in said rigid jaws in a radial direction of a surface of a pipe, said clamping jaws having contact surfaces adapted to the surface of a pipe for holding at least one pipe end, two angle levers each being connected to a respective one of said clamping jaws, a tie rod connected to said angle levers, a first handle integral with said rigid jaws, an operating system including a first lever through which said tie rod passes, a second lever having a second handle protruding therefrom, and a strap, a first fastener connecting said first lever to said first handle, a second fastener connecting said first lever to said strap, a third fastener connecting said second lever to said strap, a fourth fastener connecting said second lever to said first handle, said second and third fasteners being separate from said first handle, said first and second levers and said strap operating together in the vicinity of an extended position thereof in which said second, third and fourth fasteners are disposed along a straight line, a spring member biased between said tie rod and said operating system, said strap and said second lever forming a knee joint movable beyond said extended position for locking pipe ends into the welding tongs, a track, a welding electrode disposed on said track, and a motor connected to said electrode for moving said electrode along said track relative to said clamping jaws.

2. Welding tongs according to claim 1, wherein said spring member surrounds said tie rod, said tie rod has a threaded section, and including a nut disposed on said threaded section for adjusting the effective length of said tie rod.

3. Welding tongs according to claim 1, wherein said clamping jaws open in a given opening direction, and including another spring biasing said tie rod for moving said clamping jaws in said opening direction.

4. Welding tongs according to claim 1, wherein said clamping jaws fix the axis of the pipe in place, said track is a slide being adjustable in position relative to said clamping jaws, and including means cooperating with said slide for moving said electrode along a straight line at right angles to the axis of the pipe and parallel to the axis of the pipe.

5. Welding tongs according to claim 4, wherein said electrode moving means include adjusting screws and a braking nut securing said adjusting screws up to a predetermined break away torque.

6. Welding tongs according to claim 1, wherein said motor moves said electrode along said track, said motor is parallel to said tie rod, and said tie rod and said motor are disposed in said handle.

7. Welding tongs according to claim 5, including a miter gear transmission connecting said motor to said electrode, said transmission including miter gears, another spring, and means for manually disengaging said miter gears against the force of said other spring.

8. Welding tongs according to claim 6, including a miter gear transmission connecting said motor to said electrode, said transmission including miter gears, another spring, and means for manually disengaging said miter gears against the force of said other spring.

9. Welding tongs according to claim 8, wherein said transmission includes an operating lever in said handle for disengaging said transmission.

10. Welding tongs according to claim 1, including a wire advancing mechanism having a two-roller drive for directional adjustment.

* * * * *